Nov. 11, 1924.  
G. J. SNYDER  
CHANGE SPEED TRANSMISSION  
Filed March 25, 1921  
1,514,738  
2 Sheets-Sheet 1
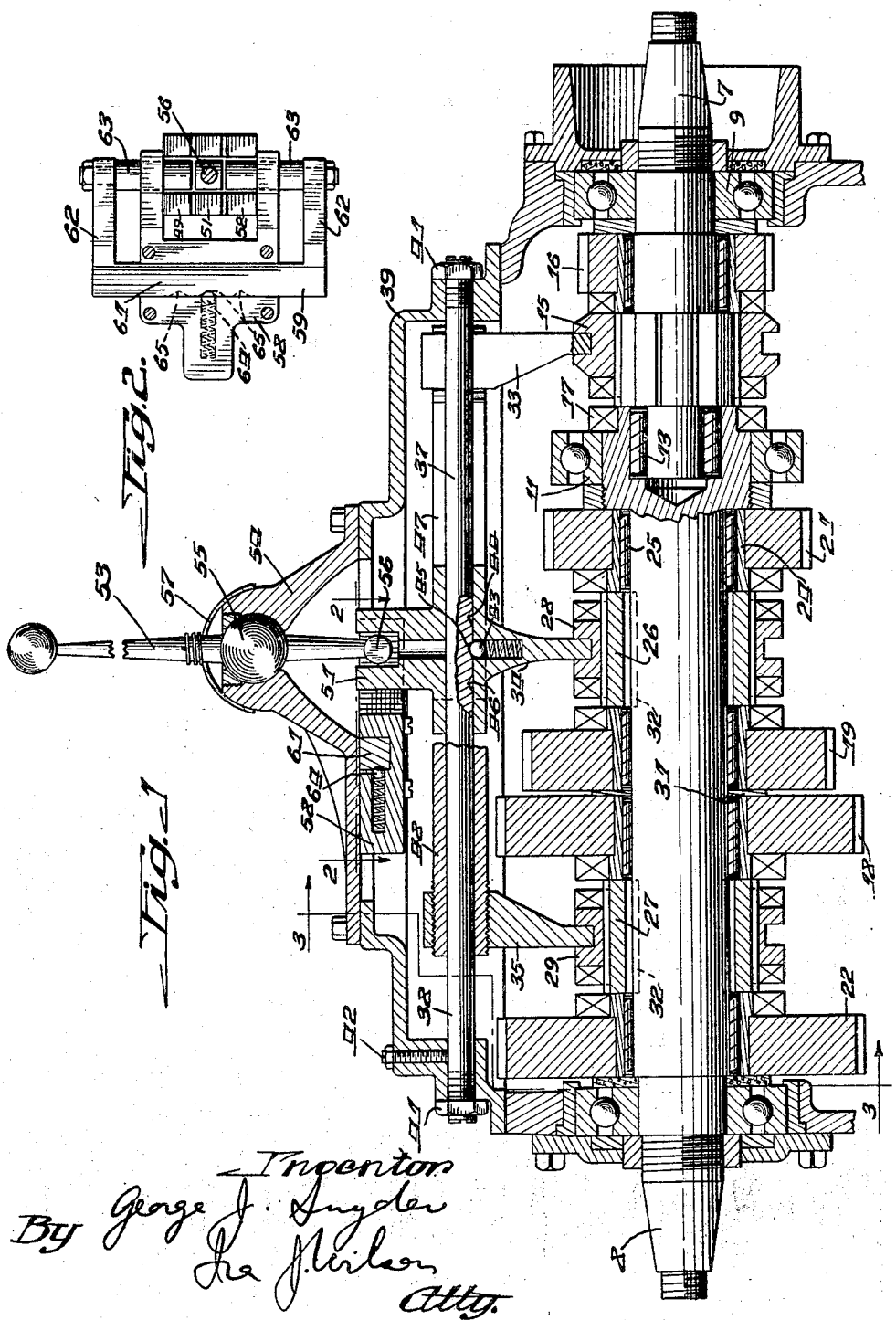

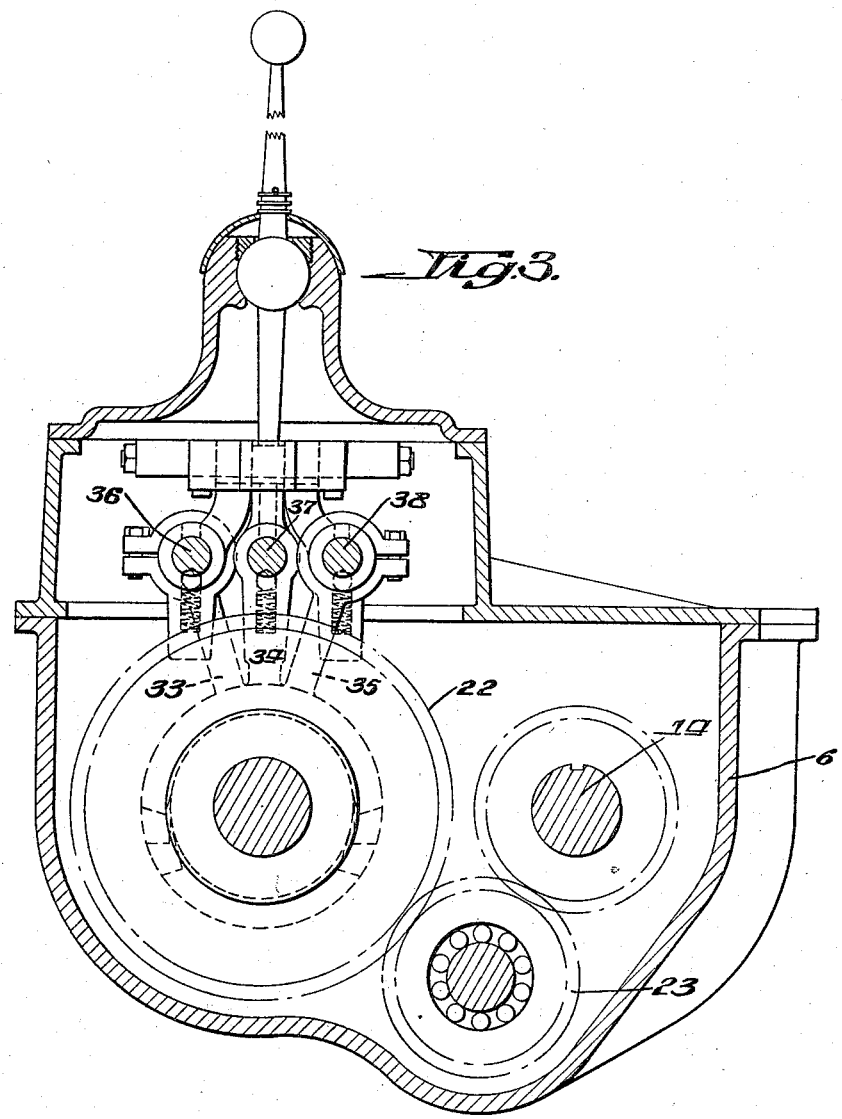

Patented Nov. 11, 1924.

1,514,738

UNITED STATES PATENT OFFICE.

GEORGE J. SNYDER, OF ROCKFORD, ILLINOIS.

CHANGE-SPEED TRANSMISSION.

Application filed March 25, 1921. Serial No. 455,628.

*To all whom it may concern:*

Be it known that I, GEORGE J. SNYDER, a citizen of the United States, residing at Rockford, in the county of Winnebago and State of Illinois, have invented certain new and useful Improvements in Change-Speed Transmissions, of which the following is a specification.

This invention relates in general to transmission mechanism, and has more particular reference to change speed transmissions particularly adapted for use on motor vehicles.

The primary object of this invention is to provide a change speed transmission of generally improved and novel construction, whereby to insure greater accuracy and dependability in operation, and also to promote economy in manufacture.

In furtherance of these general objects, my invention contemplates the provision of novel control lever locking mechanism which shall insure against accidental operation or displacement of any of the speed-changing devices, except the one selected for operation by the control lever.

Another important object of my invention is the provision of novel means for supporting the clutch-shifting parts, whereby to enable greater accuracy and precision in construction and assembly, especially to the end that the shiftable clutch elements and their operating parts may be very accurately set irrespective of variations in the course of manufacture, to insure the proper engagment of the clutch elements.

Still another object is to mount the several gears and clutch elements on the driven shaft in such novel manner as to reduce to a minimum the machine operations in the production of this shaft and the parts carried thereby.

Other objects and attendant advantages will be appreciated by those familar with the art as the invention becomes better understood by reference to the following description when considered in connection with the accompanying drawings, in which—

Figure 1 is a vertical sectional view through a change speed transmission embodying my invention; and Figs. 2 and 3, sectional views taken substantially on the lines 2—2 and 3—3 respectively, of Fig. 1.

My invention is particularly applicable to that class of change speed transmissions characterized by the provision of driving and driven parts in axial alignment, a counter-shaft, gearing connecting the counter-shaft with the driving and driven parts, and clutches on the driven shaft adapted for connecting any gear thereto for transmitting the speed of such gear. In the present instance, I have illustrated only such parts of a transmission of this kind as are essential for an understanding of the invention.

Referring now more particularly to the drawings, a suitable casing 6 supports driving and driven shafts 7 and 8 respectively, through the agency of anti-friction bearings 9, 11 and 12, it being noted that the driving shaft has a pilot bearing 13 in the driven shaft. A counter-shaft 14 suitably journaled in the casing 6 and shown only in Fig. 3, may be driven in any suitable manner from the driving shaft 7, this connection in the present instance being established by means of a shiftable clutch element 15 splined on the driving shaft and adapted to connect thereto a spur gear 16 which is constantly in mesh with a gear (not shown) fixed to the counter-shaft 14. The clutch element 15 has clutch teeth at each end, so that upon being shifted in the opposite direction it is adapted to engage the teeth 17 on the driven shaft, whereby to directly connect the driving and driven shafts. A plurality of gears 18, 19, 21 and 22 loose on the driven shaft, are in constant mesh with gears fixed to the counter-shaft, this connection with the gear 22 being through the agency of an intermediate gear 23 for the purpose of reversing the direction of drive. Each of the gears 18 to 22 inclusive, fixed to a sleeve 24, carries clutch teeth and is mounted on the shaft 8 through agency of suitable anti-friction roller bearings 25. The collars 26 and 27 keyed to the shaft 8, are peripherally splined and carry double face clutch elements or collars 28 and 29 respectively. It will be obvious that either of these collars may be axially shifted for connecting either of the adjoining gears to the driven shaft. It will be further noted that the gear sleeves 24 and the splined collars 26 are in abutting relation with the exception of the interposed spacing collar 31. By reason of this construction it is not necessary to spline the driven shaft or to perform various turning and threading operations requisite in other designs of transmissions now in common use. It follows that the cost of producing thep resent driven shaft and of the parts mounted thereon, is materially reduced by reason of the fact that the only special machine operations throughout the length of the shaft occupied by the gears and clutches is that of milling the key slots 32.

The clutch collars 15, 28 and 29 are adapted to be axially shifted by means of forks 33, 34 and 35 respectively, which are slidably supported on rods 36, 37 and 38. These rods in turn, are supported at their ends in the cover plate 39 of the transmission casing and are equipped with locking nuts 41, whereby the rods may be axially adjusted and secured in any set position. Each rod may be further locked against rotative movement by means of a set screw 42 or the equivalent. Each fork carries a spring-pressed finder ball or detent 43 adapted to engage in any of the sockets 44, 45 or 46 in its respective rod. The end forks 33 and 35 are threadingly engaged upon sleeves 47 and 48 respectively, which reach to the center of the transmission. These sleeves 47 and 48 and the casting with which the fork 34 is formed integral, are shaped to provide upstanding yokes 49, 51 and 52, which are in lateral alignment when the clutches are in the neutral position shown in Fig. 1.

A control lever 53 suitably mounted on a cover plate 54 through the agency of a ball and socket mounting 55, has an operated end 56 adapted by lateral movement of the lever to be positioned intermediate the arms of any of the clutch shifting yokes 49, 51 and 52, in which position such yoke may be shifted by the lever for engaging and disengaging its respective clutch. In the present instance, a suitable spring-pressed cap 57 is employed on the control lever for housing the open end of the ball and socket mounting, the cap being semi-spherical and concentric with the ball mounting so as to constitute a tightly fitting closure at all times. To the underside of the cover plate 54 is secured a bracket 58 which carries a U-shaped locking member designated generally by 59, the transverse portion 61 of which is slidable laterally in said bracket and the arms 62 of which are equipped with inwardly extending co-axial locking fingers 63. These fingers, shown in Fig. 2, extend into close proximity to the operated end 56 of the control lever, so that by moving this lever laterally in either direction, it will engage one of the fingers 63 and shift the member 59 laterally. It will be readily seen that in the normal position of the control lever as shown in the drawings, its end 56 is in operative relation to the central yoke 51 and that the fingers 63 are located between the arms of the yokes 49 and 52, thereby locking them against shifting. When the control lever is shifted laterally to either side, as for example, to position its end 56 in operative relation to the yoke 52, the member 59 will be correspondingly shifted and the yokes 49 and 51 will be locked against shifting by one of the fingers 63. It will be readily seen that the foregoing provides a device operated by movement of the control lever for selectively engaging any one of the speed changing parts, for positively locking the remaining speed changing parts against operation, and that the device is not dependent upon springs or other auxiliary means for effecting this result. In order to facilitate and insure proper alignment of the control lever with any selected change speed yoke, I have provided a suitable spring-pressed finder ball 64 operative between the bracket 58 and the part 61, the latter of which is provided with sockets 65 corresponding in position to the forks 49, 51 and 52.

The present transmission provides four speeds forward and one reverse. As shown in Fig. 1, the counter-shaft is connected to the driving shaft 7 through the agency of the clutch member 15, this being the neutral condition. By connecting the gear 18 to the driven shaft as by means of the clutch 29, the first speed is obtained. The gears 19 and 21 when connected to the driven shaft establish the second and third speeds respectively. The fourth speed is established by directly connecting the driving and driven parts through means of the clutch 15. The reverse drive is obtained by connecting the gear 22 to the driven shaft by means of the clutch 29. The clutches are controlled as described above by the yokes 49, 51 and 52 through operation of the control lever in the well known manner.

In order to centralize each shiftable clutch collar with respect to the gear clutches when assembling the transmission, the fork-supporting rods 36, 37 and 38 will be axially adjusted and set or locked in the requisite positions, it being observed that the location of the shifting forks may be adjusted by reason of the co-operative relation between the finder balls 43 and the sockets 44 to 46 inclusive in the yoke-supporting rods.

It is believed that the foregoing conveys a clear understanding of the objects prefaced above, and while I have illustrated and described but a single working embodiment of my invention, it should be understood that various changes might be made in the construction and arrangement without departing from the spirit and scope of the invention as expressed in the appended claims.

I claim:

1. In a change-speed transmission, the combination of a plurality of shiftable clutch elements axially spaced, a fork for shifting each clutch element, a supporting rod for each fork and upon which it is slidable, and a control lever for shifting the forks, one of said forks being supported upon said rod at a point remote from the control lever through the agency of a sleeve and having a connection with said sleeve permitting axial adjustment of the fork upon the sleeve.

2. A change speed transmission comprising change speed mechanism including a plurality of parts adapted to be shifted for effecting changes in speed, a casing therefor including a cover, a control lever mounted on the cover through the agency of a ball and socket and having a depending operated end, a plurality of upstanding yokes in the casing normally in lateral alignment and between the arms of which said operated end of the control lever is adapted to be engaged for selective connection of any of said yokes by tilting the upper end of the lever laterally and which are adapted to be shifted by fore-and-aft movement of said lever for operating said change speed parts, a locking member having a transverse portion, longitudinal arms and transverse locking fingers disposed in a horizontal plane, said transverse portion being mounted to slide transversely in said plane to bring said fingers into and out of the space between said arms of the yokes, and said fingers extending inwardly into proximity to the operated end of the control lever and adapted to be shifted by the latter, whereby said lever when selectively connected with any shifting yoke will cause said fingers to positively lock the remaining shifting yokes against operation, and a spring-pressed element adapted to engage in recesses in said transverse portion for holding the latter against displacement from any of its operated positions.

GEORGE J. SNYDER.